(12) United States Patent
Ponder et al.

(10) Patent No.: US 9,881,384 B2
(45) Date of Patent: Jan. 30, 2018

(54) METHOD AND APPARATUS FOR PROVIDING ONE OR MORE ROAD CONDITIONS BASED ON AERIAL IMAGERY

(71) Applicant: HERE Global B.V., Veldhoven (NL)

(72) Inventors: Joel Ponder, Chicago, IL (US); Leon Oliver Stenneth, Chicago, IL (US)

(73) Assignee: HERE Global B.V., Veldhoven (NL)

( * ) Notice: Subject to any disclaimer, the term of this patent is extended or adjusted under 35 U.S.C. 154(b) by 192 days.

(21) Appl. No.: 14/566,391

(22) Filed: Dec. 10, 2014

(65) Prior Publication Data

US 2016/0171278 A1    Jun. 16, 2016

(51) Int. Cl.
| | | |
|---|---|---|
| G06K 9/00 | (2006.01) |
| G06T 7/20 | (2017.01) |
| G06T 7/40 | (2017.01) |
| G06T 7/00 | (2017.01) |
| G06T 7/90 | (2017.01) |

(52) U.S. Cl.
CPC ............ *G06T 7/408* (2013.01); *G06K 9/0063* (2013.01); *G06K 9/00651* (2013.01); *G06T 7/90* (2017.01); *G06T 2207/30236* (2013.01)

(58) Field of Classification Search
None
See application file for complete search history.

(56) References Cited

U.S. PATENT DOCUMENTS

| | | |
|---|---|---|
| 3,930,735 A | 1/1976 | Kerr |
| 4,847,772 A | 7/1989 | Michalopoulos et al. |
| 7,650,227 B2 | 1/2010 | Kirk et al. |
| 2001/0038718 A1* | 11/2001 | Kumar .................. G06T 3/0081 382/284 |
| 2010/0086174 A1* | 4/2010 | Kmiecik ............ G06K 9/00798 382/103 |
| 2010/0277588 A1* | 11/2010 | Ellsworth ........... G06F 17/3087 348/144 |
| 2013/0027554 A1* | 1/2013 | Meadow ....................... 348/144 |

(Continued)

FOREIGN PATENT DOCUMENTS

| | | |
|---|---|---|
| CN | 202887456 U | 4/2013 |
| WO | 2013001307 A1 | 1/2013 |

OTHER PUBLICATIONS

Lenhart et al., "Automatic Traffic Monitoring Based on Aerial Image Sequences", Pattern Recognit. Image Anal. (2008) 18, pp. 400-404.*

(Continued)

*Primary Examiner* — Matthew Bella
*Assistant Examiner* — Jose M Torres
(74) *Attorney, Agent, or Firm* — Ditthavong & Steiner, P.C.

(57) ABSTRACT

An approach is provided for providing one or more road conditions based on aerial imagery. The road condition platform processes and/or facilitates a processing of one or more road segments on an aligned image including an aerial image frame of an area and a reference map of the area to determine one or more non-road elements. The road condition platform also determines one or more characteristics of the one or more non-road elements disposed within the one or more road segments. The road condition platform further determines one or more road conditions based on the one or more characteristics.

17 Claims, 12 Drawing Sheets

(56) References Cited

U.S. PATENT DOCUMENTS

2013/0197790 A1* 8/2013 Ouali ............... G08G 1/0133
  701/118
2013/0287261 A1  10/2013 Lee et al.
2014/0362082 A1* 12/2014 Schpok ............... G06T 17/05
  345/427

OTHER PUBLICATIONS

Hobler et al., "Automated Traffic Analysis in Aerial Images", Proceedings of the 8th International Conference on Sensing Technology, Sep. 2-4, 2014, pp. 95-99.*

* cited by examiner

METHOD AND APPARATUS FOR PROVIDING ONE OR MORE ROAD CONDITIONS BASED ON AERIAL IMAGERY

BACKGROUND

Service providers and device manufacturers (e.g., wireless, cellular, etc.) are continually challenged to deliver content and convenience to consumers. One area of interest has been providing traffic conditions (e.g., vehicular traffic and/or pedestrian traffic). However, traffic conditions are typically derived from traffic data gathered from stationary road-side sensors (e.g., loop detectors, microwave sensors, and/or video cameras) and/or global positioning system (GPS) receivers (e.g., GPS probe data). The quality and/or availability of the data can be limited due to the coverage of the sensors and receivers and thus the traffic conditions derived from this data may not be complete, accurate and/or timely. Accordingly, service providers and device manufacturers face significant technical challenges to providing traffic conditions.

SOME EXAMPLE EMBODIMENTS

Therefore, there is a need for an approach for providing more timely, accurate, and/or complete traffic conditions.

According to one embodiment, a method comprises processing and/or facilitating a processing of one or more road segments on an aligned image including an aerial image frame of an area and a reference map of the area to determine one or more non-road elements. The method also comprises determining one or more characteristics of the one or more non-road elements disposed within the one or more road segments. The method further comprises determining one or more road conditions based on the one or more characteristics.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of one or more road segments on an aligned image including an aerial image frame of an area and a reference map of the area to determine one or more non-road elements. The apparatus is also caused to determine one or more characteristics of the one or more non-road elements disposed within the one or more road segments. The apparatus is further caused to determine one or more road conditions based on the one or more characteristics.

According to another embodiment, a computer-readable storage medium carries one or more sequences of one or more instructions which, when executed by one or more processors, cause, at least in part, an apparatus to process and/or facilitate a processing of one or more road segments on an aligned image including an aerial image frame of an area and a reference map of the area to determine one or more non-road elements. The apparatus is also caused to determine one or more characteristics of the one or more non-road elements disposed within the one or more road segments. The apparatus is further caused to determine one or more road conditions based on the one or more characteristics.

According to another embodiment, an apparatus comprises means for processing and/or facilitating a processing of one or more road segments on an aligned image including an aerial image frame of an area and a reference map of the area to determine one or more non-road elements. The apparatus also comprises means for determining one or more characteristics of the one or more non-road elements disposed within the one or more road segments. The apparatus further comprises means for determining one or more road conditions based on the one or more characteristics.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing one or more road conditions based on aerial imagery are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although the various embodiments described herein are discussed with respect to vehicular traffic on roads, it is contemplated the approaches of the various embodiments are also applicable to monitoring pedestrian traffic on roads and/or other type of pedestrian travel segments (e.g., sidewalks, paths, etc.).

Figure 1:
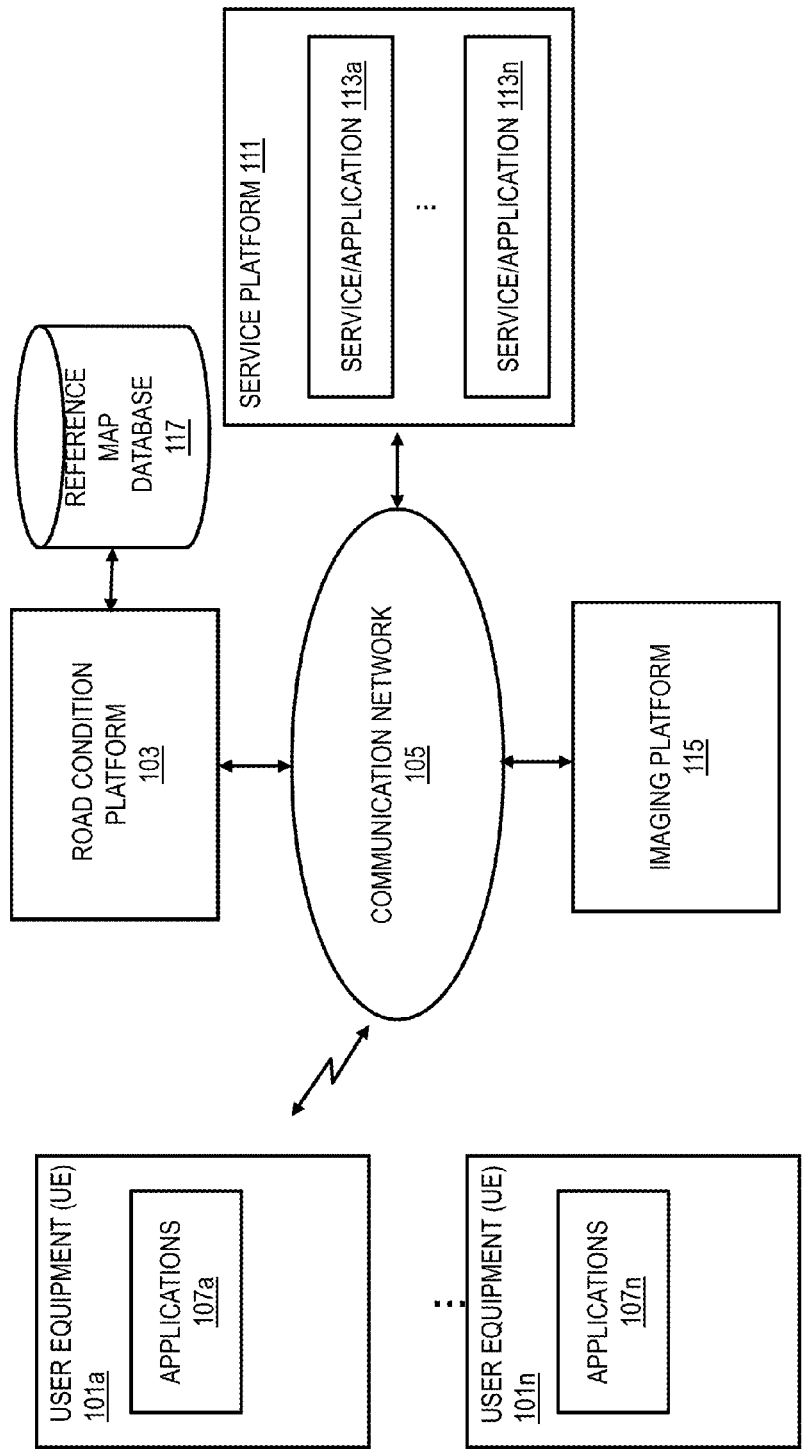
FIG. 1 is a diagram of a system capable of providing one or more road conditions based on aerial imagery, according to one embodiment.

FIG. 1 is a diagram of a system capable of capable of providing one or more road conditions based on aerial imagery, according to one embodiment. Traffic conditions are typically determined from stationary road-side sensor data and GPS probe data. However, the accuracy of the data depends on the coverage of the sensors and the GPS receivers. Thus, the traffic conditions derived from such data may be limited and may not be accurate. For example, the data may not be capable of providing positional accuracy with respect to the traffic condition.

To address this problem, a system 100 of FIG. 1 introduces the capability to provide one or more road conditions based on aerial imagery. The one or more road conditions include a volume of one or more vehicles traveling on a road segment (e.g., traffic volume), a density of one or more vehicles traveling on a road segment (e.g., traffic density), a speed of one or more vehicles (e.g., traffic speed), a location of one or more vehicles traveling with respect to the one or more road segments (e.g., vehicles parked in median and/or shoulder), a volume of one or more vehicles parked (e.g., parking volume), a location of one or more vehicles parked with respect to the one or more road segments (e.g., parking availability), or a combination thereof. The one or more road segments may be any defined area of a road (e.g., lane, median, shoulder, etc.) and/or parking lot (e.g., parking spot, parking lane, etc.). The road segment is not limited to a vehicle network, and may include for example a waterway.

The system 100 may determine the one or more road conditions at lane level and/or parking spot level. For example, the system can determine the traffic volume, density and/or traffic speed with respect to one or more lanes provided in an area. The system can also determine whether vehicles are stopped in a shoulder and/or median. The system can further determine whether a parking spot and/or parking lane with respect to parking lots provided in an area. In this way, the system 100 can determine lane level impact and/or parking availability. Therefore, the system 100 can provide a more complete overview of congestion within a road network.

More specifically, the system 100 may determine the one or more road conditions of the road segment based on one or more non-road elements. A non-road element may be any moving or stationary object that is not native to the road (e.g., median, curbs, etc. are native to the road). A non-road element may include but is not limited to a vehicle, train, helicopter, temporary road blockade, among others, or a combination thereof. A vehicle may be any moving vehicle that is capable of carrying one or more human occupants and is powered by any form of energy. For example, the vehicle includes, but is not limited to: cars, trucks, vans, minivans, SUVs, motorcycles, scooters, boats, personal watercraft, and/or aircraft.

As shown in FIG. 1, the system 100 comprises a user equipment (UE) 101 having connectivity to a road condition platform 103 via a communication network 105. The UEs 101 may include or have access to an application 107 (or applications 107), which may consist of client programs, services, or the like, that may utilize the road condition platform 103, or other services, applications, content, etc. available over the communication network 105. By way of example, the application 107 may be any type of application that is executable at the UE 101, such as location-based service applications, traffic service applications, navigation applications, mapping applications, content provisioning services, and the like.

In one embodiment, the road condition platform 103 may determine one or more non-road elements disposed in one or more road segments from an aligned image including an aerial image frame from of an area and a reference map of the area. In one embodiment, the road condition platform may receive an aerial image frame from an imaging platform 115. The aerial image frame may be any type of raster image. The raster image, may include but is not limited to a photograph, forward looking infrared (FLIR), RADAR, LIDAR, microwave, among others, or a combination thereof. The platform 115 may be any imaging platform used for aerial imagery. The imaging platform 115 may include but is not limited to UAV, kite, balloon, rocket airship, satellite, or other aircraft. In one embodiment, the imaging platform 115 may take an image of an area at a ground sample distance of less than or equal to 1 M.

In one embodiment, the road condition platform 103 may align the aerial image frame and the reference map based one or more markers located in the area. In one embodiment, the area may include by more than two markers, for example, three markers. The markers can enable proper alignment between the aerial image and the reference map.

In one embodiment, the one or more target markers may be placed near ground level in the area imaged. The one or more target markers may have a constrained width. This can enable the target markers to be located and read no matter how it is oriented. In one embodiment, each of the target markers may include a symmetric binary pattern of alternating reflective and non-reflective properties in a binary fashion, an identifying number (e.g., a bar code), or a combination thereof. For example, for light photographic imagery, the pattern may be of alternating solid colors, a black (non-reflective) and a bright color. The bright color may be any bright color because black will be read the same under any lighting condition. In one embodiment, the one or more markers may be illuminated to ensure visibility by the imaging platform 115.

In one embodiment, the road condition platform 103 may obtain the reference map of the area from a reference map database 117. The reference map database 117 may store a plurality of reference map data. Each reference map of an area may be a vector map of the one or more road segments with a location and/or size of the one or more target markers in that area recorded. The vector map may, for example, may be based on geographic information system (GIS) data.

In one embodiment, the road condition platform 103 may determine the one or more road segments in the aligned image based on one or more properties of the image. For example, the road condition platform 103 may determine the one or more road segments based on the pixels in the image. The road condition platform may divide the pixels into one or more road segments (e.g., one or more road lanes, parking spots, etc.) based on one or more properties of the pixels. In one embodiment, the pixels of the aerial image frame may be assigned to the one or more road segments recorded in the reference map based on position and/or color. If the pixels lie on a border of the road segment, fuzzy logic can be used to determine whether the pixels correspond to the one or more road segment.

The road condition platform 103 may assign pixels to road segments at the lane level and parking spot level. For example, the one or more road segments may be distinguished between the driving lane(s), median(s), shoulder(s), among others, or a combination thereof. The road condition platform 103 may determine a color property for the one or more road segments. The color property may correspond to color value with the highest frequency in the one or more road segments. In one embodiment, a reduced color palate may be used to compensate for road color inconsistencies. In this way, the road can be accurately reconstructed and a more complete look at congestion may be achieved.

In one embodiment, the road condition platform 103 may determine the non-road elements based on the one or more properties of a cluster of pixels. For example, the road condition platform 103 may determine the color property and/or location of a cluster of pixels with respect to the one or more road segments. For example, the non-road element may be defined as a cluster of pixels of a different color from the road.

The road condition platform 103 may further process the one or more non-road elements to determine and remove those elements likely not a vehicle and/or and an object or structure affecting traffic. For example, the road condition platform 103 may compare a position of the one or more non-road elements with the one or more road segments to determine an occlusion (e.g., a tree, sign, or any structure (e.g., bridge walkway) that may occlude the view of the road), undesired road elements (e.g., a hovering helicopter), among others. In one embodiment, the road condition platform 103 can remove the occlusions and undesired road elements from the aligned image and thereby exclude them from the non-road elements.

The road condition platform 103 may determine the one or more road conditions based on one or more characteristics of the one or more non-road elements. The one or more characteristics include a size of the one or more non-road elements, a shape of the one or more non-road elements, a color property of the one or more non-road elements, a location of the one or more non-road elements with respect to the one or more road segments, or a combination thereof. For example, the road condition platform 103 can determine traffic volume, traffic density, a speed of one or more vehicles, vehicles parked in median and/or shoulder, parking volume, parking availability (spots taken and/or available), or a combination thereof from the aligned image In one embodiment, the road condition platform 103 may compare the one or more characteristics of one or more non-road segments in the (current) aligned image with the corresponding characteristic(s) in a previous aligned image to determine the one or more road conditions (e.g., speed). For example, speed of one or more non-road elements may be determined as distance and time changes between pixels corresponding to the non-road element(s) in the images. The speed may be determined for at the road-level (e.g., all lanes) and/or lane-level (e.g., with respect to a specific lane).

The road condition platform 103 may determine the one or more road conditions according to a many different methods. In one embodiment, the road condition platform 103 may determine the method based on the completeness of the information. The properties (e.g., the image time since last frame, maximum recorded speed, segment length, previous unique elements, etc.) of the aligned image may infer the completeness. For example, the road condition platform 103 may determine the method based on the properties of the aligned image to determine whether speed should be determined based on all non-road elements, a few non-road elements, or a combination thereof. By way of example, the road condition platform 103 may determine the speed based on difference in locations of all non-road elements, in locations of unique element(s) (e.g., non-road elements that are found for the first time in the previous frame), or a combination thereof.

In certain embodiments, the road condition platform 119 and/or one of the applications 107 may have access to other traffic systems. For example, the road condition platform 119 and/or one of the applications may receive traffic data from other traffic systems, e.g., GPS probe data. For example, the road condition platform 119 and/or one of the applications 107 may utilize applications, services, sensors, etc., to collect such information. In one embodiment, the road condition platform 119 and/or one of the applications 107 may have connectivity to a location determination sensor system, such as a Global Positioning System (GPS) to access GPS satellites to determine e.g., location of the UE 101.

The traffic information and/or aerial image may also be provided by a service platform 111 which includes one or more services 113a-113 n (e.g., traffic conditions service, content broadcasting service, etc.). In one embodiment, the traffic data and/or aerial image is delivered from to the UE 101 through the service platform 111 and/or the services 113 a-113 n.

In certain embodiments, the road condition platform 103 may use the traffic data from other traffic systems to determine the one or more road conditions (e.g., when the image information is incomplete (e.g., image reference rate is low)), or to calibrate the one or more road conditions determined. For example, the road condition platform 103 may use the traffic data to determine the speed for a determined traffic density and distribution.

By way of another example, the road condition platform 103 may use the traffic data from the other traffic systems to determine historical road condition information. The historical road condition information may correspond to a historic difference between the traffic data from the other traffic system and the one or more road conditions determined by the road condition platform 103. For example, historically, if the speed of a segment that is computed by the road condition platform 103 is 20 kph and the speed computed for a probe based system is 23 kph for the same segment, then the historical road condition information (e.g., difference) is +3 KPH. And in this example, the road condition platform 103 may calibrate any determined speeds of a car by adding 3 KPH to the determined speed based on the aligned image.

In one embodiment, the road condition platform 103 may determine a confidence rating associated with the determined one or more road conditions. For example, the confidence rating may be based on resolution, occlusion, and/or frame rate associated with the aerial image frame.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, in-vehicle navigation device, a personal navigation device (PND), a portable navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In one embodiment, the road condition platform 103 may be a platform with multiple interconnected components. The road condition platform 103 may include multiple servers. In addition, it is noted that the road condition platform 103 may be a separate entity of the system 100, a part of the one or more services 113 of the services platform 111, or included within the UE 101 (e.g., as part of the applications 107).

By way of example, the UE 101 and the road condition platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
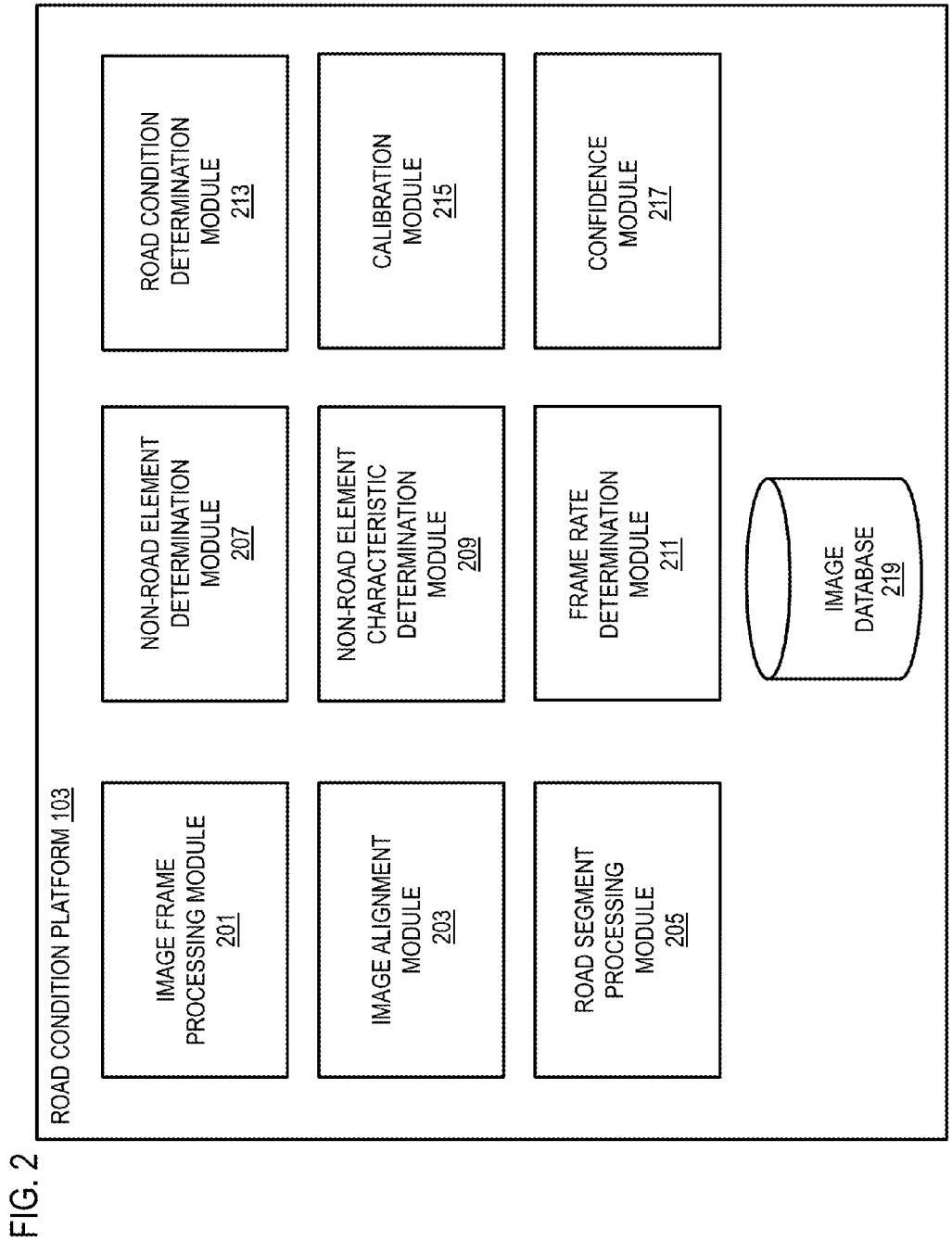
FIG. 2 is a diagram of the components of the road condition platform, according to one embodiment.

FIG. 2 is a diagram of the components of road condition platform 103, according to one embodiment. By way of example, the road condition platform 103 includes one or more components for providing one or more road conditions based on aerial imagery. It is contemplated that the functions of these components may be combined in one or more components or performed by other components of equivalent functionality. In this embodiment, the road condition platform 103 includes an image frame processing module 201, an image alignment module 203, a road segment processing module 205, a non-road element determination module 207, a non-road element characteristic determination module 209, a frame rate determination module 211, a road condition determination module 213, a calibration module 215, a confidence module 217, and an image database 219.

The image frame processing module 201 can process an aerial image frame of an area obtained by the imaging platform 115. The aerial image frame may include one or more target markers disposed within the area. In one embodiment, the image frame processing module 201 may correct the frame for any lens distortion. In certain embodiments, the image frame processing module 201 may receive an image frame corrected for lens distortion. The image processing module 201 may determine the time since an aerial image frame of that area was received by the imaging platform. The imaging processing module 201 may also correct for corruption, for example, by determining and discarding any corrupted any portions of the frame.

The image alignment module 203 may align the aerial image frame and the reference map of the area, based, at least in part, on the one or more target markers disposed in the area. The image alignment module 203 may locate the one or more target markers in the frame, for example, by scanning through the pixels for the pattern associated with each marker. The image alignment module 203 may align the markers in the reference map with the aerial image frame. For example, the image alignment module 203 may analyze the markers to determine one or more properties of the image. The one or more properties of the image may include but are not limited to location, orientation, scale, pitch, among others, or a combination thereof of the image. The image alignment module 203 may perform 3D transformation of the reference map to match the image, for example, so that the one or more characteristics of the reference map match the one or more characteristics of the aerial image frame.

The road segment processing module 205 may process the one or more road segments to identify each the one or more road segments in the aerial image frame. In one embodiment, the road segment processing module 205 may assign pixels from the aerial image frame to the corresponding road segment(s) (e.g., lanes, median, shoulder, etc.) in the reference map. If one or more pixels lie on a boarder of a road segment, the road segment processing module 205 may use fuzzy logic to determine whether that pixel should be assigned to the road segment.

The road segment processing module 205 may determine the color property of the pixels corresponding to a selected road segment. The color property of a road segment may include a color value with the highest mode in the selected road segment.

In one embodiment, the road segment processing module 205 may reduce the color palette before determining the color property. In this way, the road segment processing module 205 may compensate for road color inconsistencies.

The non-road element determination module 207 may process the aligned image frame to determine the one or more non-road elements. The non-road element determination module 207 may determine one or more clusters of pixels disposed within the one or more road segments that have a color property different from the color property for the one or more road segments. The non-road element determination module 207 may further analyze the one or more clusters to determine whether they correspond to occlusions, undesired non-road elements, among others, or a combination thereof and exclude such elements from the data. For example, the non-road element determination module 207 may exclude any cluster that extends beyond the boundary of the road segment. In this way, the non-road element determination module 207 can exclude objects (e.g., tree or structure) that are occluding the view of the road but are not affecting and/or part of the road traffic. The non-road element determination module 207 may also process each cluster to determine whether they correspond to an undesired non-road element. For example, the non-road element determination module 207 can determine whether the clusters correspond to objects (e.g., hovering helicopter) that be may not be affecting traffic or an object that is directly affecting traffic (e.g., a road closure). For example, the non-road element determination module 207 can determine whether the cluster corresponds to a road closure, for example, due to jacked-knifed trailer blocking traffic.

The non-road element determination module 207 can also determine whether any cluster overlaps one or more sections of the road segment (e.g., a vehicle exists in two lanes). The overlapping data may represent a vehicle changing lanes and/or vehicle parked in the median, and the non-road element determination module 207 may indicate the non-road element accordingly.

The non-road element determination module 207 may also determine a location of non-road elements with respect to the one or more road segments to determine whether any non-road elements are located in a parking lane, a parking spot and/or shoulder if the reference map includes such information.

The non-road element determination module 207 may record the one or more non-road elements associated with the image in the image database 219.

The non-road element characteristic determination module 209 may determine the one or more characteristics of the one or more non-road elements and record the one or more characteristics in the image buffer 219. The one or more characteristics may include but is not limited to size, shape, color, location with respect to the one or more road segments and/or image frame, among others, or a combination thereof.

The frame rate determination module 211 may determine the image frame rate. For example, the frame rate determination module 211 can determine the time since the previous aerial image frame of the area was received by the road condition platform 103.

The road condition determination module 213 may determine one or more road conditions based on at least the one or more characteristics of the one or more non-road elements. The road condition platform 213 can extrapolate the one or more road conditions based on the one or more characteristics of the non-road elements determined by the non-road characteristic module 209. The one or more road conditions may include but are not limited to a volume of one or more vehicles traveling on a road segment, a density of one or more vehicles traveling on a road segment, a speed of one or more vehicles, a location of one or more vehicles traveling with respect to the one or more road segments, a volume of one or more vehicles parked, a location of one or more vehicles parked with respect to the one or more road segments, or a combination thereof.

The road condition determination module 213 may determine the one or more road conditions by comparing the aligned image to a previous aligned image of the area. For example, the road condition determination module 213 may determine the speed of the one or more vehicles based on distance and time changes of pixels in the aligned image and a previous image.

In one embodiment, the road condition determination module 213 may select a method to determine the speed based on the image frame rate (e.g., time since previous frame), maximum recorded speed, length of the one or more road segments, previous frame unique non-road elements, or a combination thereof. The road condition determination module 213 may determine the speed for segment and/or section of the segment (e.g., lanes) as a function of the mean of all speeds within the interquartile range.

For example, if the time between a previous frame and the current frame is within a sufficient range (e.g., time is lower than the amount of time it takes a car to travel half the distance of a road segment driving about the speed limit) such that a unique non-road element should be disposed in the previous image should be in the current image, the road condition determination module 213 may determine the speed based on the one or more unique non-road elements. If previous frame includes a car having a size, shape and/or color that is unique for that road segment and being detected for the first time in the first half of the road segment, the vehicle may be considered to be a unique non-road element. The road condition determination module 213 can determine the velocity from the distance that the vehicle has moved between frames divided by the time between frames.

In another example, if the time between a previous frame and the current frame is within a higher range such that a non-road element disposed in the previous image should be in the current image (e.g., overlapping pixels), the road condition determination module 213 may compare the location of one or more non-road elements in the current frame to the respective location in the previous frame and calculate speeds for those non-road element(s). In this example, any non-road element of sufficient length may be used to determine the speed for the road segment/lane. For example: if the fastest recorded speed on a road segment is 40 meters per second, if the average car is 4 meters long and the image frame rate is higher than 10 fps, then some pixels from the non-road element will exist in the same pixel space from frame to frame. This continuity can be used to maintain the identity of a non-road element from frame to frame, and thus the road condition determination module 213 can determine the velocity by measuring the distance traveled between two frames divided by the time between the two frames. In one embodiment, the road condition determination module 213 may not use consecutive frames and rather use a previous frame that was taken several seconds before the current frame.

In yet another example, if the time between a previous frame and the current frame is below a threshold, the road condition determination module 213 may determine the speed of the one or more non-road elements from traffic data from another traffic system (e.g., GPS probe data). The road condition determination module 213 can obtain traffic data from another traffic system regarding for the one or more road segments. In one embodiment, the road condition determination module 213 may analyze the volume and/or distribution of non-road elements in the image and determine speed based on the GPS probe data.

The calibration module 215 may calibrate the one or more road conditions determined by the road condition determination module 213, for example, using historical road condition information from another traffic system (e.g., GPS probe data). The historical road condition information may indicate a historic difference between outputs of the road condition determination module 213 and another traffic system. The calibration module 215 may apply the historical road condition information to the one or more road conditions determined by the road condition determination module 213 and thereby calibrate the one or more road conditions, so that, for instance, a known difference is applied to the imaging system's output. For example, historically, if the speed of a segment that is computed by the road condition determination module 213 is 15 kph and the speed computed for a probe based system is 22 kph for the same segment, then the historical road condition information (e.g., difference) is +7 KPH. And in this example, the road condition determination module 213 determines a car having speed of 10 KPH, and the calibration module 215 would calibrate the determined speed with the historical road information so that calibrated speed is 17 KPH (10+7).

The confidence module 217 may determine a confidence rating associated with the one or more road conditions determined by the road condition determination module 213 and/or calibrated by the calibration module 215. For example, the confidence module may determine a confidence rating based on resolution, occlusion, and/or frame rate associated with the image frame.

Figure 3:
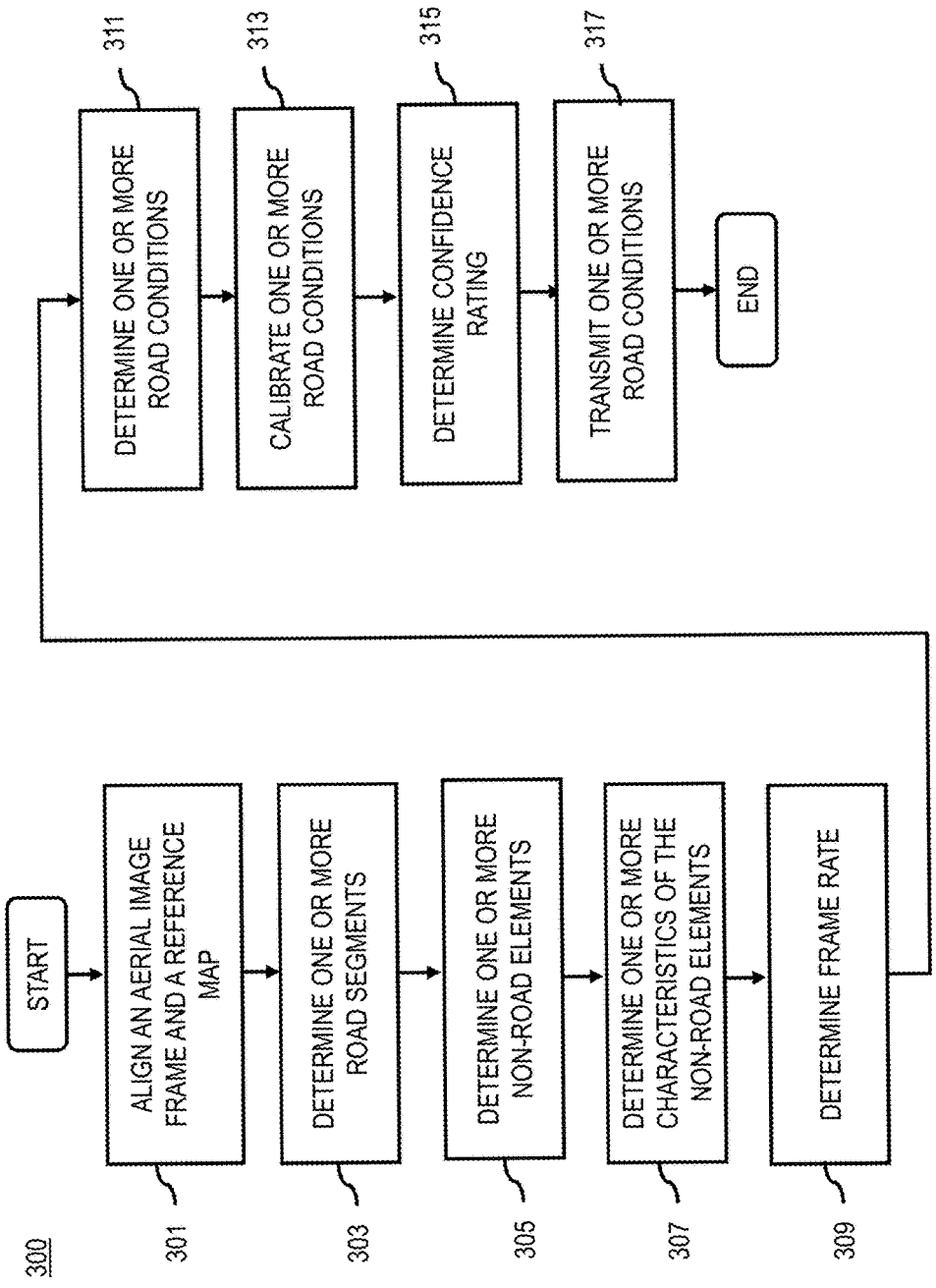
FIG. 3 is a flowchart of a process for determining one or more road conditions, according to one embodiment.
Figure 7:
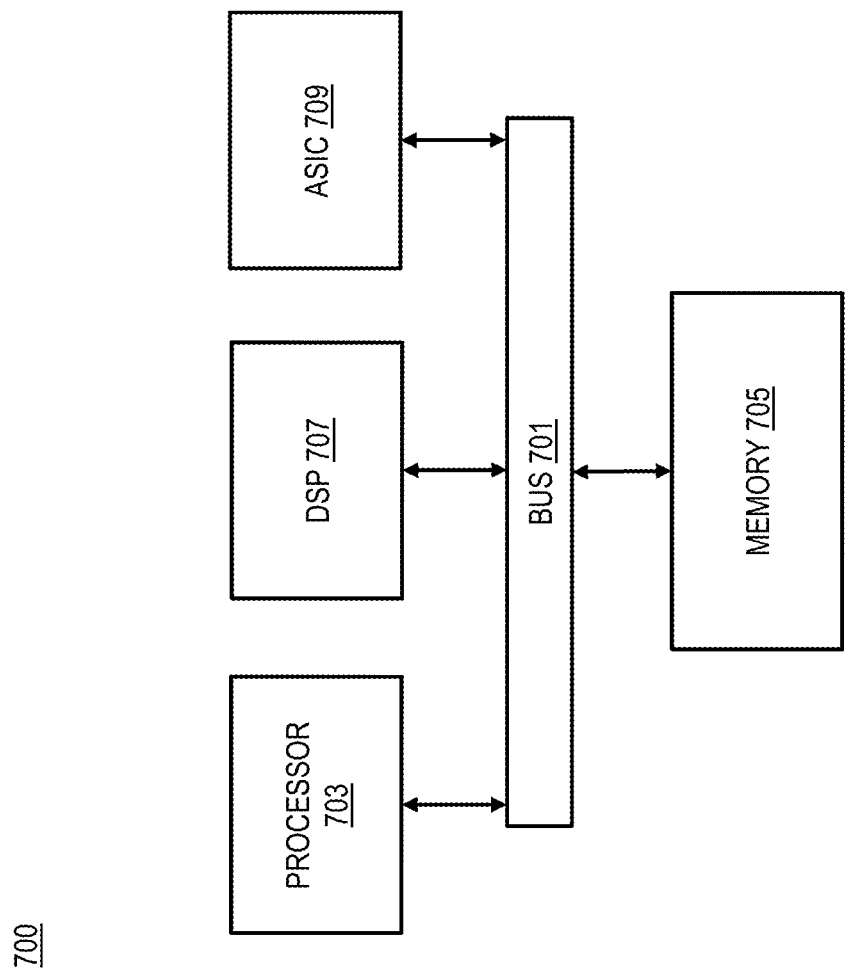
FIG. 7 is a diagram of a chip set that can be used to implement an embodiment of the invention.

FIG. 3 is a flowchart of a process for determining one or more road conditions based on aerial imagery, according to one embodiment. In one embodiment, the road condition platform 103 and/or an application 107 performs the process 300 and is implemented in, for instance, a chip set including a processor and a memory as shown in FIG. 7. Throughout this process, the road condition platform 103 is referred to as completing various portions of the process 300, however it is understood that the UE 101 can perform some of and/or all of the process steps.

In step 301, the road condition platform 103 aligns an aerial image frame and a reference map based on one or more target markers. The road condition platform 103 locates the markers in the aerial image frame, analyzes the markers, and determines properties of the image (e.g., location, scale, orientation and/or pitch of the frame). The road condition platform 103 may transform the reference map to match the properties of the image frame, for example, using 3D transformation, and align the markers in the reference map to the aerial image.

The road condition platform 103 may determine color properties for one or more road segments (step 303). The one or more road segments disposed in the aerial image may be selected. The road condition platform 103 may first determine the pixels that correspond to the one or more road segments by assigning pixels of the aerial image to the reference map. The road condition platform 103 may also determine the pixel assignment for those that lie on a border of a segment by using fuzzy logic.

The road condition platform 103 may then determine the color value with the highest mode in the (selected) road segment. In one embodiment, the road condition platform 103 may use a reduced color palate to compensate for inconsistencies in color of the road. The color value with the highest mode corresponds to the color of the one or more color segments.

The road condition platform 103 may determine the one or more non-road elements (step 305). The road condition platform 103 may first determine the non-road elements based on the color properties. The road condition platform 103 may determine the color properties (e.g., color) of each cluster of pixels and determine that the cluster can correspond to a non-road element if the color property is different from the road segment(s). The road condition platform 103 may then analyze the pixel clusters to determine whether they should be excluded from the non-road elements because they correspond to occlusions and/or non-road elements. For example, if the road condition platform 103 may determine that the cluster of pixels extend beyond the boundary, the road condition platform may determine that the cluster likely corresponds to a tree or a structure that occludes a view of the road (e.g., walkway bridge). In another example, the road condition platform 103 may process each cluster to determine whether they correspond to a structure or object that is not affecting the traffic conditions (e.g., a hovering helicopter).

The road condition platform 103 may then determine the one or more characteristics of the one or more non-road elements (step 307). The road condition platform 103 may determine a size of the one or more non-road elements, a shape of the one or more non-road elements, a color property of the one or more non-road elements, a location of the one or more non-road elements with respect to the one or more road segments, or a combination thereof. The road condition platform 103 may determine whether a car is parked in a spot based on a location of the cluster of pixels with respect to the reference map (e.g., for example if the reference map includes parking spots and/or lanes). The road condition platform 103 can record the one or more characteristics with respect to each non-road element in the aligned image in the image database 219. The road condition platform 103 may also indicate whether the one or more non-road elements are unique (e.g., whether the one or more non-road elements is first detected in the first half of the road segment).

The road condition platform 103 may determine the frame rate and/or other properties of the image (step 309). The frame rate may correspond to the time between the current aerial image and the previous aerial image. The road condition platform 103 may determine how many data points (e.g., how many non-road elements) should be used to determine one or more road conditions based on the image frame rate. The properties may also include maximum recorded speed, segment length, previous unique elements provided in the aligned image. Thereby, the road condition platform can provide a more accurate representation of traffic and congestion.

The road condition platform 103 may then determine the one or more road conditions based on the one or more characteristics of the one or more non-road elements (step 311). The road condition platform 103 may determine the one or more road conditions from the one or more characteristics, a comparison of the (current) one or more characteristics in the aligned image to a previous image, or a combination thereof. For example, the road condition platform 103 can determine the parking volume, parking availability, traffic volume, traffic speed, traffic density, among others, from the one or more characteristics determined in step 307.

The road condition platform 103 may also compare the one or more characteristics of the one or more non-road elements of the current image with a previous image of the area to determine the one or more road conditions, for example, speed. The road condition platform 103 may select and use a method to determine the one or more road conditions based on the properties of the image (e.g., frame rate). For example, if the image frame rate is above a threshold, the road condition platform 103 may determine the speed of the traffic based on one or more non-road elements. By way of further example, the more complete the information (e.g., the higher the image frame rate), the speed may be determined based on a portion of the one or more non-road elements (e.g., unique elements). If the image frame rate is sufficient and/or the image frame does not include a unique element, the road condition platform 103 may determine the speed based on the all of the non-road elements. On the other hand, if the image frame is low and thus the information provided in the aerial image may be incomplete, the road condition platform 103 may determine the speed by supplementing with other traffic data from another traffic system. The road condition platform 103 may determine the volume and/or distribution of the non-road elements and determine speed using the other traffic data.

In other example, the road condition platform 103 may determine whether a car is stalled within a lane, parked in a shoulder and/or median by comparing the location between image frames.

In one embodiment, the road condition platform 103 may calibrate the one or more road conditions, for example, using historical road condition information (step 313). For example, the road condition platform 103 may use historical road condition information based on GPS probe data to adjust the determined one or more road conditions.

In one embodiment, the road condition platform 103 may then determine a confidence rating of the one or more road conditions (step 315). For example, the road condition platform 103 may determine a confidence rating based on resolution, occlusion and/or frame rate.

The road condition platform 103 may then transmit the one or more road conditions, for example, to an application 107 and/or to the service providers 113 to provide as a service 111 to the UE 101 (step 317). In one embodiment, the road condition platform 103 may transmit the one or more road conditions with the confidence rating. In one embodiment, the road condition platform 103 may transmit the one or more road conditions in a notification to a user.

Figure 4A:
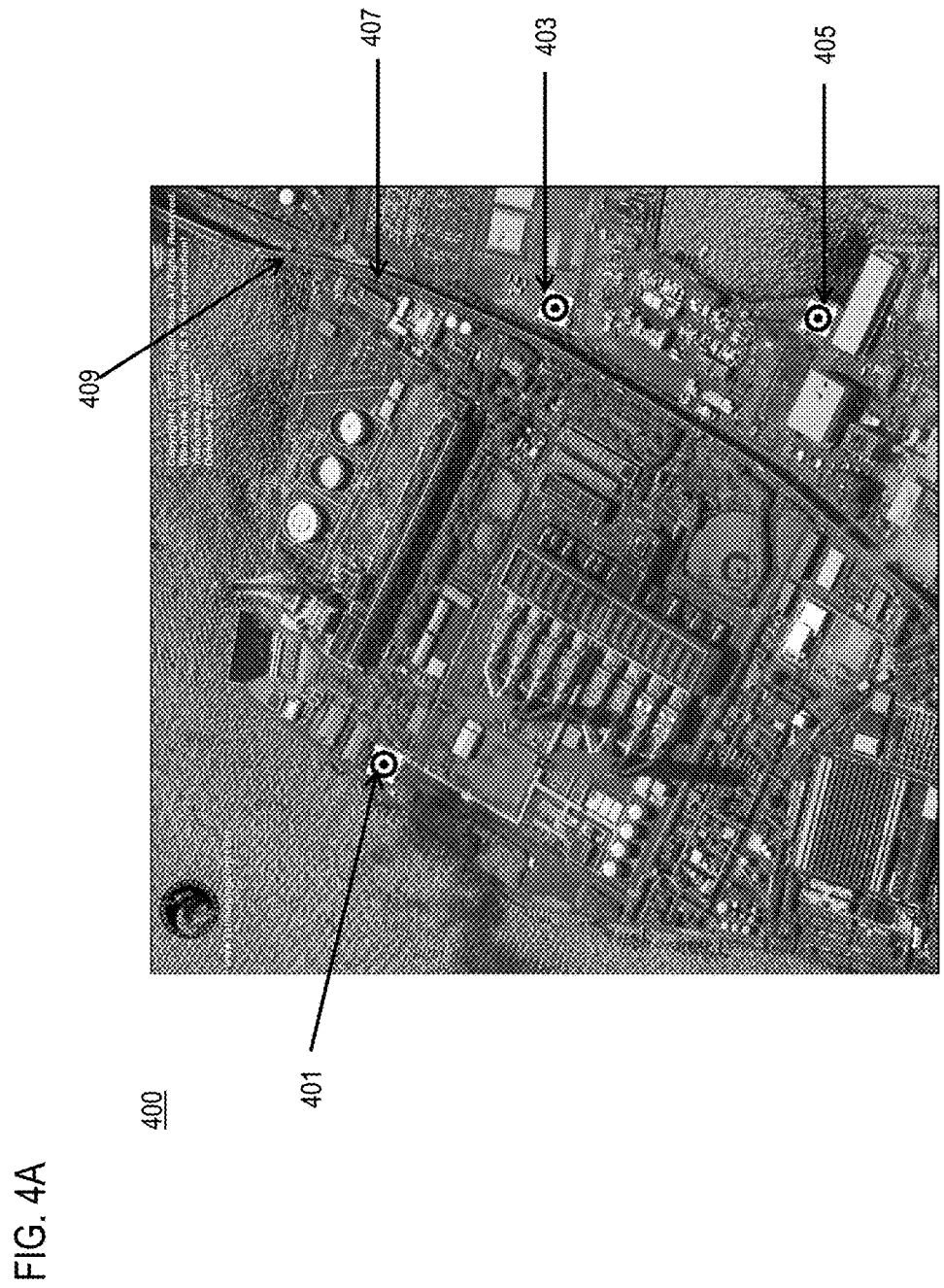
FIGS. 4A-4D are examples of a determination of non-road elements from an aerial image utilizing the processes of FIG. 3.
Figure 4B:
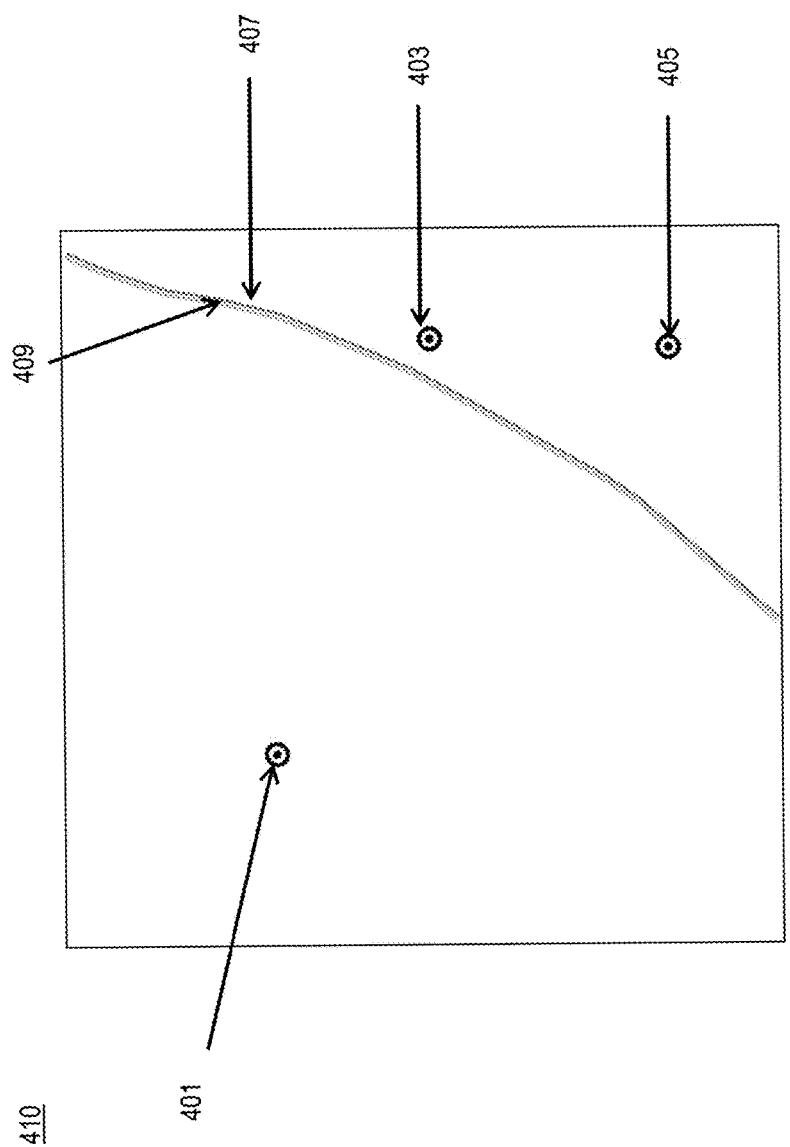
Figure 4C:
Figure 4D:
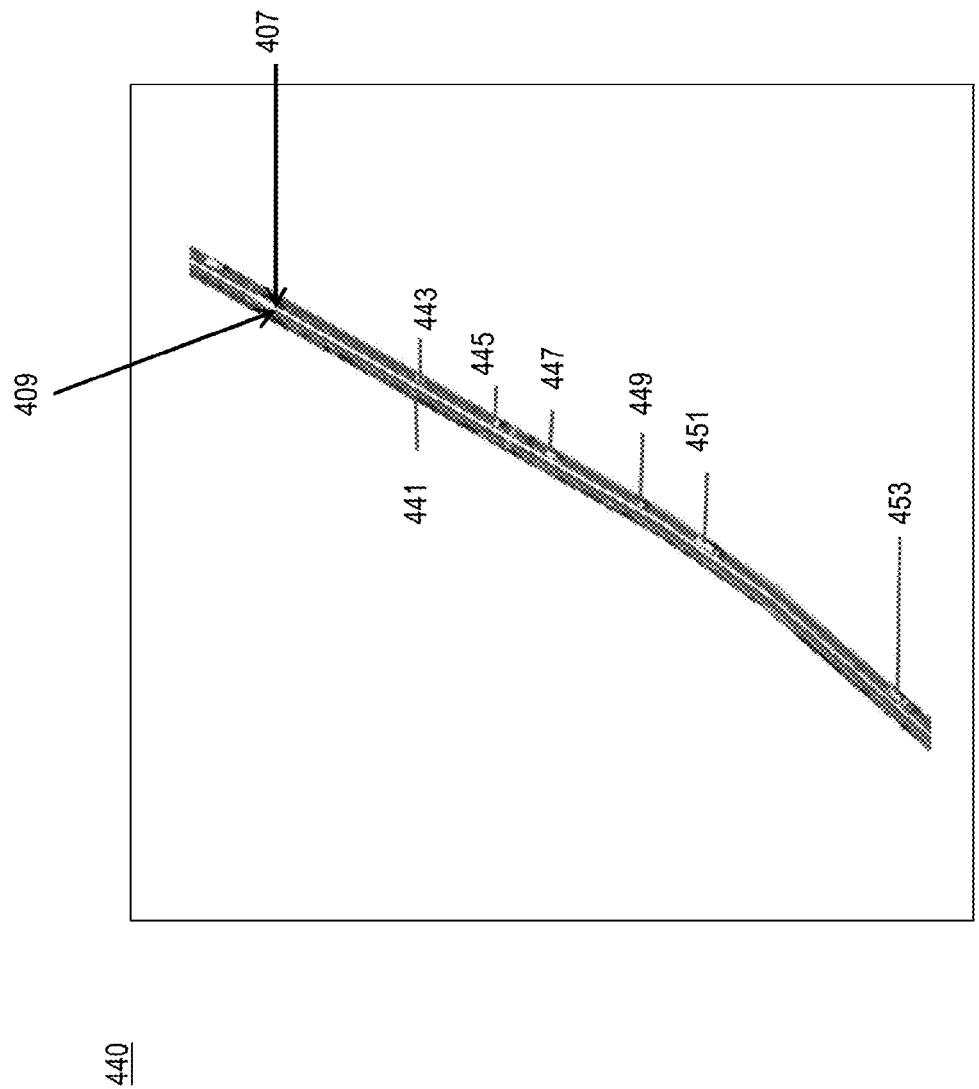

FIGS. 4A-4D are examples of a determination of non-road elements from an aerial image utilizing the processes of FIG. 3. FIG. 4A shows an aerial image 400 of an area including road segments 417 and 419 (e.g., lanes) and three target markers 401, 403, and 405. The road condition platform 103 detects the targets by their binary patterns and determines the location, scale, direction orientation and/or pitch of the image. The road condition platform 103 then transforms the reference map based on this information. FIG. 4B shows a transformed reference map 410 with the target markers 401, 403, and 405 and the road segments 407 and 409. The road condition platform 103 may then align the transformed reference map 410 and the image 400. FIG. 4C shows an aligned image 420. As shown in the image 420, the images are aligned based on the target markers 401, 403, and 405 and thereby others features, such as road segments 407 and 409, can be matched between the images. The road condition platform 103 can then determine the non-road elements disposed on the road segments 407 and 409 based on color properties. FIG. 4D shows an image 440 showing determined non-road elements 441, 443, 445, 447, 449, 451, and 453. The road condition platform 103 may determine the color value for the road segments 417 and 419. Based on the non-road elements 441, 443, 445, 447, 449, 451, and 453 disposed in the 440, the road condition platform 103 can determine traffic volume, parked cars, and cars located in the median. The road condition platform 103 can also determine image 440 to a previous frame to determine speed and/or use other traffic information to determine the speed of the elements.

Figure 5A:
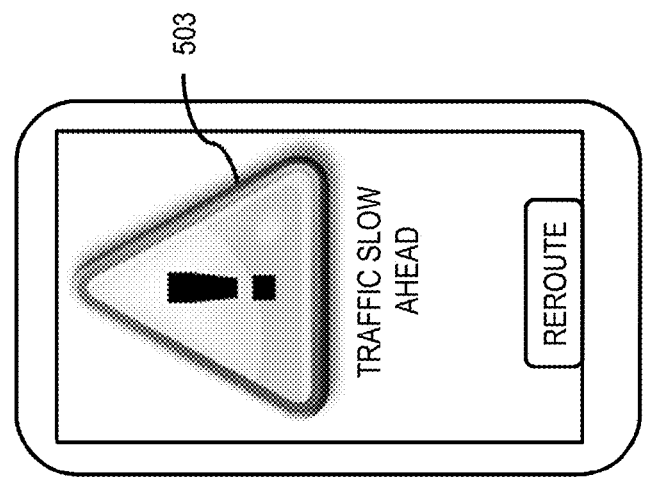
FIGS. 5A and B are diagrams of user interfaces utilized in the processes of FIG. 3, according to various embodiments.
Figure 5B:
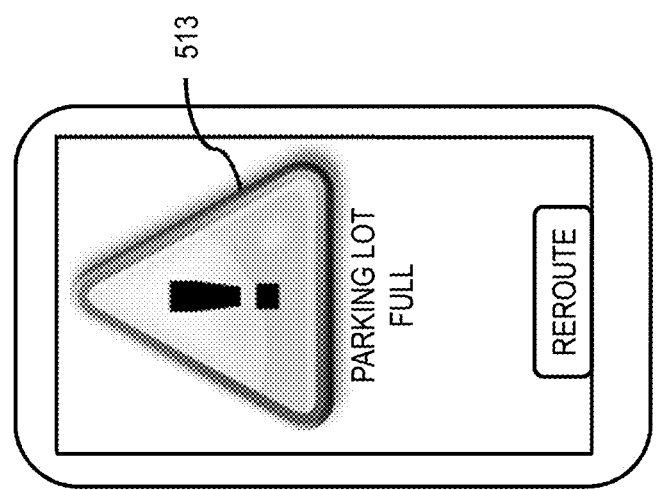

FIGS. 5A and B are diagrams of user interfaces utilized in the output from the processes of FIG. 3, according to various embodiments. FIGS. 5A and 5B show examples of notifications of road conditions. FIG. 5A show a user interface 500 with a notification 503 indicating that the traffic is slow ahead. The notification 503 can be based on the one or more characteristics provided in the image and/or a comparison of the one or more characteristics between the image and a previous image. FIG. 5B shows a user interface 510 with a notification 513 indicating that the parking lot is full.

The processes described herein for providing one or more road conditions based on aerial imagery may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
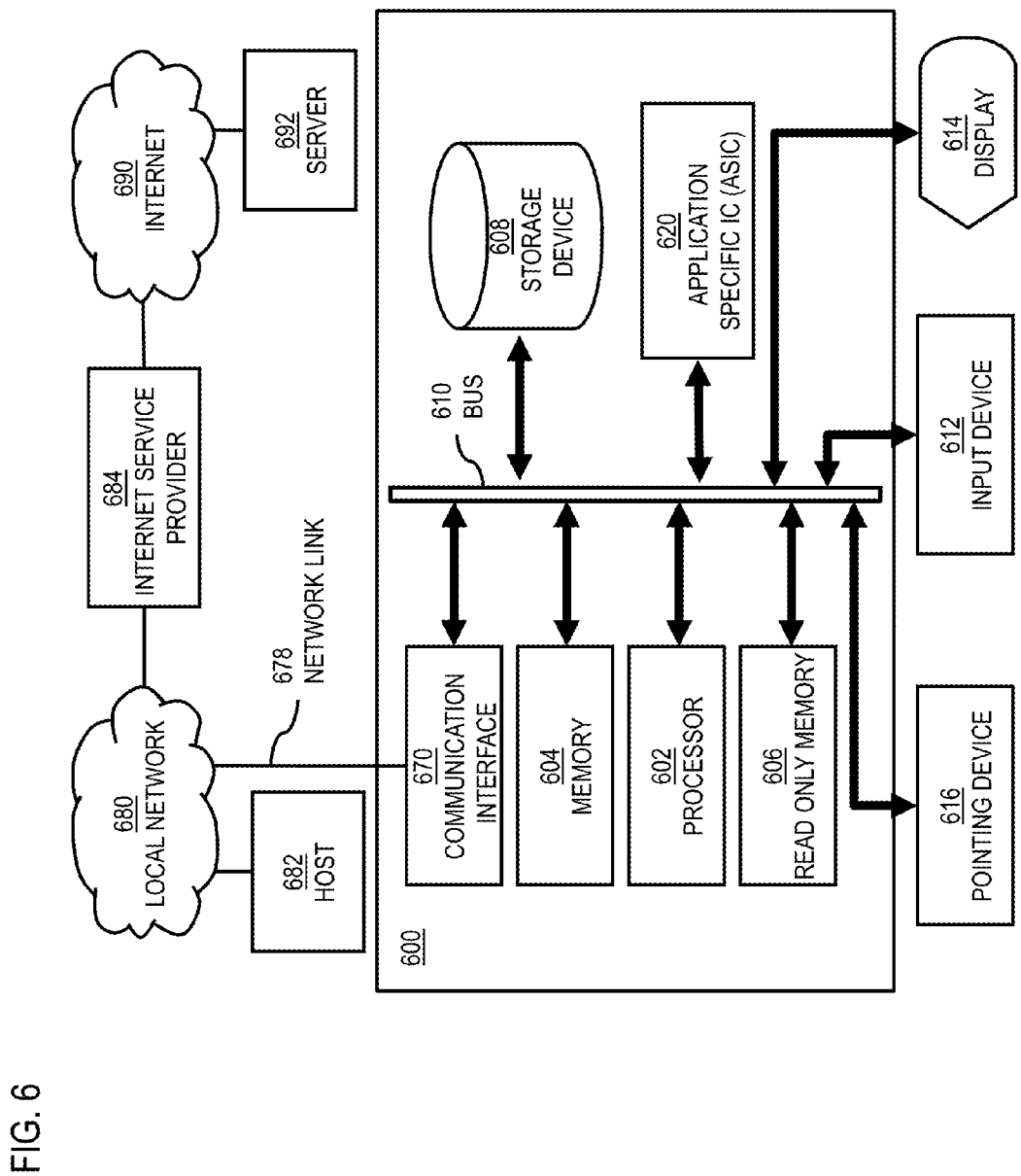
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to provide one or more road conditions based on aerial imagery as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of providing one or more road conditions based on aerial imagery.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to providing one or more road conditions based on aerial imagery. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or any other dynamic storage device, stores information including processor instructions for providing one or more road conditions based on aerial imagery. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for providing one or more road conditions based on aerial imagery, is provided to the bus 610 for use by the processor from an external input device 612, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for providing one or more road conditions based on aerial imagery to the UE 101.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set or chip 700 upon which an embodiment of the invention may be implemented. Chip set 700 is programmed to providing one or more road conditions based on aerial imagery as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of providing one or more road conditions based on aerial imagery.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to providing one or more road conditions based on aerial imagery. The memory 705 also stores the data associated with or generated by the execution of the inventive steps.

Figure 8:
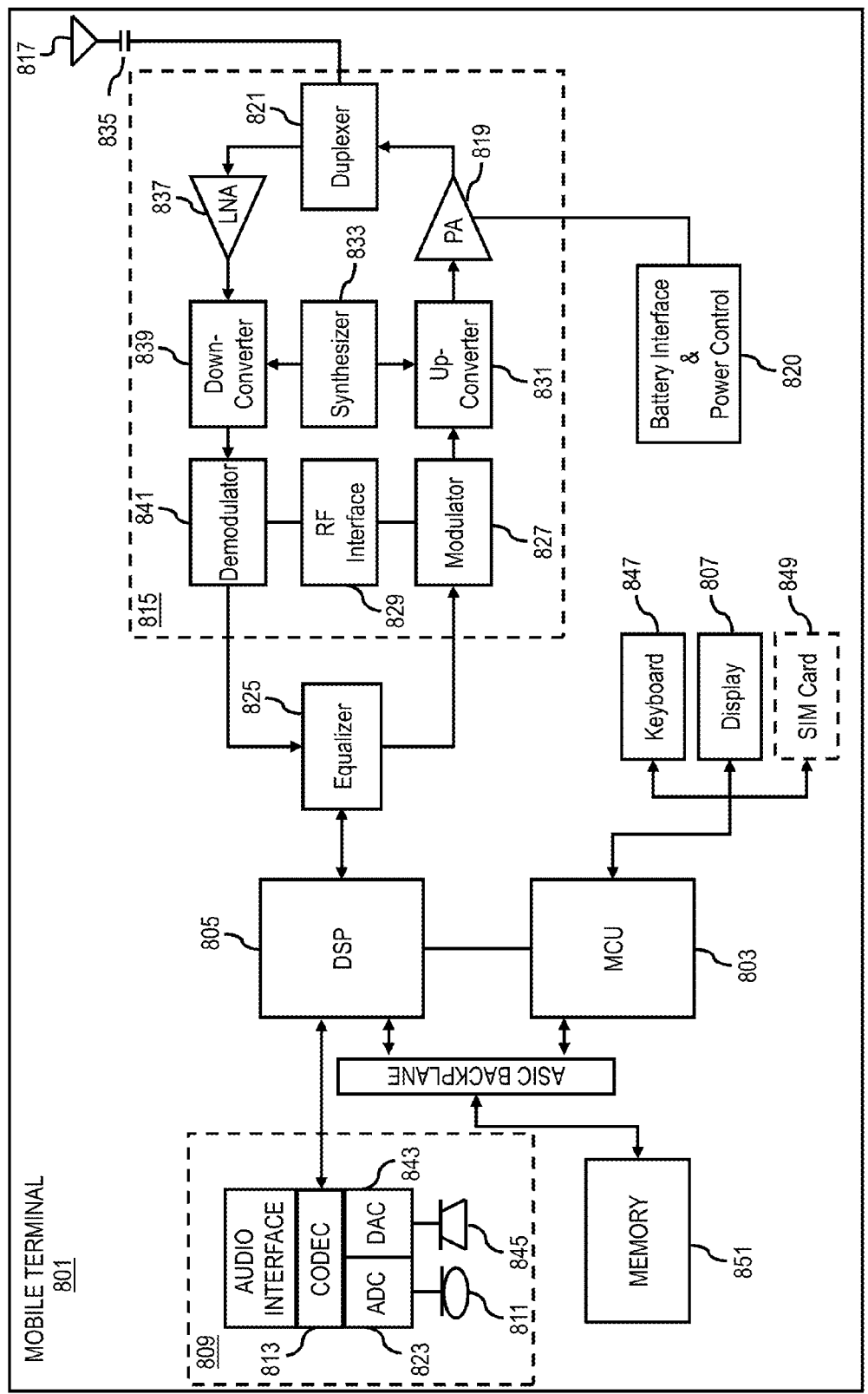
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of providing one or more road conditions based on aerial imagery. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of providing one or more road conditions based on aerial imagery. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to providing one or more road conditions based on aerial imagery. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
processing one or more road segments on an aligned image including an aerial image frame of an area and a reference map of the area to determine one or more non-road elements;
determining one or more characteristics of the one or more non-road elements disposed within the one or more road segments;
determining one or more road condition based on the one or more characteristics; and
creating the aligned image by aligning the aerial image frame and the reference map based, at least in part, on one or more target markers disposed near ground level in the area,
wherein the one or more target markers includes an identification number, a symmetric binary pattern of alternating reflective and non-reflective properties, or a combination thereof.

2. A method of claim 1, further comprising:
processing the aligned image to determine a color property for the one or more road segments; and
processing the aligned image to determine one or more cluster of pixels disposed within the one or more road segments that has a color property different from the color property for the one or more road segments;
wherein the one or more cluster of pixels corresponds to the one or more non-road elements.

3. A method of claim 1, wherein the one or more non-road elements include a vehicle; and wherein the one or more road conditions include a volume of one or more vehicles traveling on a road segment, a density of one or more vehicles traveling on a road segment, a speed of one or more vehicles, a location of one or more vehicles traveling with respect to the one or more road segments, a volume of one or more vehicles parked, a location of one or more vehicles parked with respect to the one or more road segments, or a combination thereof.

4. A method of claim 1, further comprising:
calibrating the one or more road conditions based, at least in part, on historical road condition information.

5. A method of claim 1, wherein the one or more characteristics include a size of the one or more non-road elements, a shape of the one or more non-road elements, a color property of the one or more non-road elements, a location of the one or more non-road elements with respect to the one or more road segments, or a combination thereof.

6. A method of claim 1, further comprising:
   determining one or more occlusions based, at least in part, on a position of the one or more non-road elements with respect to the one or more road segments; and
   removing the one or more occlusions from the one or more non-road elements.

7. A method of claim 1, wherein the one or more characteristics includes a volume and/or a distribution of the one or more non-road elements and wherein the one or more road conditions includes a speed of the one or more non-road elements determined based on the volume and/or the distribution.

8. A method of claim 1, further comprising:
   comparing a location of each of the one or more non-road elements in the aligned image with a location of each of the one or more non-road elements in another aligned image, respectively; and
   determining a speed of each of the one or more non-road elements based on the comparing.

9. A method of claim 1, further comprising:
   determining a location of one or more unique non-road elements in a previous aligned image frame;
   determining a location of the one or more unique non-road elements in the aligned image frame;
   comparing the location of each of the one or more unique non-road elements in the previous aligned image with a location of each of the unique one or more non-road elements in the aligned image, respectively; and
   determining a speed of the one or more non-road elements based on the comparing.

10. An apparatus comprising:
    at least one processor; and
    at least one memory including computer program code for one or more programs,
    the at least one memory and the computer program code configured to, with the at least one processor, cause the apparatus to perform at least the following:
    processing one or more road segments on an aligned image including an aerial image frame of an area and a reference map of the area to determine one or more non-road elements;
    determine one or more characteristics of the one or more non-road elements disposed within the one or more road segments;
    determine one or more road conditions based on the one or more characteristics; and
    creating the aligned image by aligning the aerial image frame and the reference map based, at least in part, on one or more target markers disposed near ground level in the area,
    wherein the one or more target markers includes an identification number, a symmetric binary pattern of alternating reflective and non-reflective properties, or a combination thereof.

11. An apparatus of claim 10, wherein the apparatus is further caused to:
    processing the aligned image to determine a color property for the one or more road segments; and
    processing the aligned image to determine one or more cluster of pixels disposed within the one or more road segments that has a color property different from the color property for the one or more road segments;
    wherein the one or more cluster of pixels corresponds to the one or more non-road elements.

12. An apparatus of claim 10, wherein the one or more non-road elements include a vehicle, and wherein the one or more road conditions include a volume of one or more vehicles traveling on a road segment, a density of one or more vehicles traveling on a road segment, a speed of one or more vehicles, a location of one or more vehicles traveling with respect to the one or more road segments, a volume of one or more vehicles parked, a location of one or more vehicles parked with respect to the one or more road segments, or a combination thereof.

13. An apparatus of claim 10, wherein the apparatus is further caused to:
    calibrating the one or more road conditions based, at least in part, on historical road condition information.

14. An apparatus of claim 10, wherein the one or more characteristics include a size of the one or more non-road elements, a shape of the one or more non-road elements, a color property of the one or more non-road elements, a location of the one or more non-road elements with respect to the one or more road segments, or a combination thereof.

15. An apparatus of claim 10, wherein the apparatus is further caused to:
    determine one or more occlusions based, at least in part, on a position of the one or more non-road elements with respect to the one or more road segments; and
    removing the one or more occlusions from the one or more non-road elements.

16. A non-transitory computer-readable storage medium carrying one or more sequences of one or more instructions which, when executed by one or more processors, cause an apparatus to perform:
    processing one or more road segments on an aligned image including an aerial image frame of an area and a reference map of the area to determine one or more non-road elements;
    determining one or more characteristics of the one or more non-road elements disposed within the one or more road segments;
    determining one or more road conditions based on the one or more characteristics; and
    creating the aligned image by aligning the aerial image frame and the reference map based, at least in part, on one or more target markers disposed near ground level in the area,
    wherein the one or more target markers includes an identification number, a symmetric binary pattern of alternating reflective and non-reflective properties, or a combination thereof.

17. A computer-readable storage medium of claim 16, wherein the apparatus is further caused to perform:
    processing the aligned image to determine a color property for the one or more road segments; and
    processing the aligned image to determine one or more cluster of pixels disposed within the one or more road segments that has a color property different from the color property for the one or more road segments;
    wherein the one or more cluster of pixels corresponds to the one or more non-road elements.

* * * * *